Patented Nov. 21, 1933

1,935,663

UNITED STATES PATENT OFFICE 1,935,663

LAUNDERING METHOD

Robert A. Phair, Allendale, N. J., assignor to H. Kohnstamm & Co., Inc., New York, N. Y.

No Drawing. Application June 16, 1928
Serial No. 286,051

4 Claims. (Cl. 87—5)

The invention aims to provide an improvement in laundering in which a softening agent is added to the wash water.

I propose to use for this purpose a soluble fluoride or silicofluoride such as sodium silicofluoride for example, or a composition containing such a fluoride or silicofluoride and to add this to the wash water either separately or in the form of an ingredient in the soap; the term "fluoride" being used herein to include silicofluorides.

My invention is particularly useful in laundering waters containing suspended or dissolved iron or manganese compounds or other suspended matters.

The fluoride may be mixed with soda ash (sodium carbonates) or with soda ash and a phosphate or phosphates, and this composition used instead of the straight fluoride or fluorides.

Examples are a composition containing fifteen per cent of silicofluoride and eighty-five per cent of soda ash; or a composition of fifteen per cent of silicofluoride, twenty per cent of tri-sodium phosphate and sixty-five per cent of sodium carbonates (soda ash).

The fluoride or the above compositions may be introduced as an ingredient of the soap to aid its cleansing power by softening the water, protecting the soap and preventing precipitation of iron, or manganese compounds and other suspended matters. In this form the fluoride or fluoride composition may be used to build up the soap to the extent of approximately twenty-five per cent.

In the use of the invention in laundering, for three hundred and fifty pounds of work and using water of a hardness of one hundred parts per million, one to one and one-half pounds of fluoride or the fluoride composition will be sufficient to use in the first water. In subsequent waters for rinsing and other treatment it will not be necessary to use the described softener.

Various modifications may be made by those skilled in the art without departing from the invention as defined in the following claims.

1. A laundering process which comprises adding to wash water containing iron or manganese, a softener consisting of a composition containing about fifteen per cent water soluble silicofluoride, soda ash and tri-sodium phosphate and washing in said water in the presence of the resulting iron or manganese compounds.

2. A laundering process which comprises adding to wash water containing suspended colored mineral matter, a softener consisting of a composition containing a water soluble fluoride and soda ash, and washing fabrics directly in the wash water.

3. A laundering process which comprises adding to wash water containing suspended colored mineral matter, a softener consisting of a composition comprising a water soluble fluoride, soda ash and an alkali metal phosphate, and washing directly in the resulting wash water.

4. A laundering process which comprises adding to wash water containing suspended colored matter, a softener consisting of a composition containing about fifteen per cent water soluble silicofluoride and soda ash, and washing directly in the resulting wash water.

ROBERT A. PHAIR.